June 3, 1958 R. E. SAUZEDDE 2,837,189
SPRAG CLUTCH
Filed Feb. 18, 1954
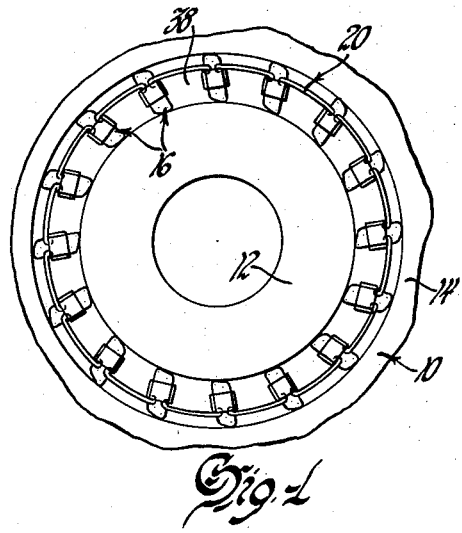
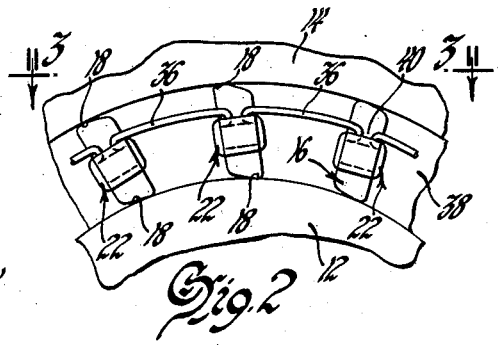
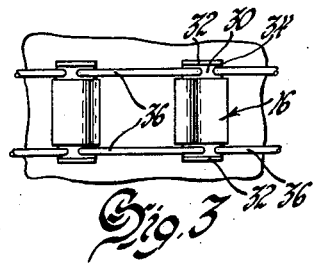
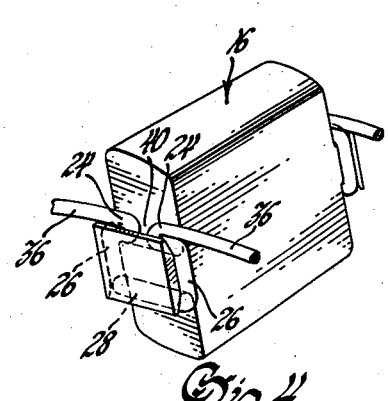
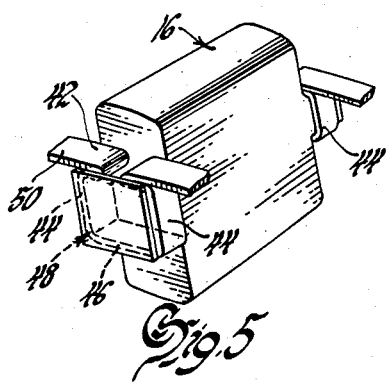
INVENTOR
Rene E. Sauzedde
BY Edward H. Goodrich
ATTORNEY United States Patent Office 2,837,189
Patented June 3, 1958

2,837,189

SPRAG CLUTCH

René E. Sauzedde, Terryville, Conn., assignor to General Motors Corporation, Detroit, Mich., a corporation of Delaware Application February 18, 1954, Serial No. 412,757

10 Claims. (Cl. 192—45.1)

This invention relates to sprag clutches and more particularly to means for positioning a plurality of sprags between two concentric cylindrical races for sliding or wedging engagement.

In a sprag type clutch it is desirable to be able to simultaneously urge the sprags into wedging or sliding engagement with the inner and outer races between which the sprags are disposed. It is therefore desirable to provide a means by which the movement of one sprag into or out of wedging engagement with the races will cause the remaining sprags to be similarly moved. It is further desiraable to provide a single sprag retaining member adapted to equally space the individual sprags between the two concentric cylindrical races. It is also desirable in sprag type clutches that the sprags be biased for engagement with the inner and outer races so that the moment the overrunning condition ceases the sprags will wedge and lock the two races together.

It is now proposed to provide means which alone is adapted to retain a plurality of individual sprags between a pair of concentric cylindrical races, to position such sprags in spaced relation to each adjacent sprag, and to dispose such sprags in near radial disposition with respect to the axis of rotation of the concentric races. Each sprag is provided with a shoulder on axially opposite ends thereof which is adapted to receive and hold such spring means thereto. The spring means includes a plurality of individual loops for receiving the shoulders of the sprags and so engaging the shoulders as to bias the cam surfaces of each sprag for engagement with each cylindrical race. The spring means further includes intermediate substantially rigid connecting portions between the loops which are adapted to simultaneously transmit the movement of any one sprag to the adjacent and following sprags for instantaneous wedging or releasing all of the sprags between the races and thereby providing a more responsive sprag type clutch.

In the drawing:

Figure 1 is a side elevational view of a sprag clutch embodying the present invention.

Figure 2 is a fragmentary view of a portion of the sprag clutch of Figure 1 shown on a slightly enlarged scale.

Figure 3 is taken in the plane of line 3—3 of Figure 2 and viewed in the direction of the arrows thereon and shows the spring means employed.

Figure 4 is a perspective view of one of the individual sprags showing the engagement of the spring means therewith.

Figure 5 is a perspective view of a modification showing a different form of spring and the manner in which it is secured to the sprag.

The present invention may be embodied in any suitable one way clutch 10 adapted to be disposed between a substantially cylindrical inner race 12 and a substantially cylindrical outer race 14 which are disposed in spaced concentric relation. In the present instance the clutch 10 is of the sprag type wherein a plurality of substantially identical tiltable grippers or sprags 16 are adapted to be disposed in circumferentially spaced relation between the inner and outer races 12 and 14. Each of the sprags 16 is disposed in a near radial position about the axis of race rotation. The inner and outer ends of the sprags 16 are provided with cam surfaces 18 formed on diagonally opposite corners thereof and which are adapted to engage the races 12 and 14. The cam surfaces 18 are formed so that the width of the sprag through the diagonal therebetween is greater than the width of the space between the two races 12 and 14. The cam surfaces 18 are adapted to be held in engagement with the races 12 and 14 so that when the outer race 14 rotates in one direction relative to the inner race 12, the cam surfaces 18 will merely slide on the races but when the outer race 14 reverses its direction of rotation relative to the inner race 12, the cam surfaces 18 of the sprags will frictionally engage the races and be tilted or rocked into a more nearly radial position relative to the axis of rotation and the sprags will wedge between the inner and outer races, locking them together. Thus, when the outer race 14 rotates in one direction relative to the inner race 12, it will overrun the inner race, but when it rotates in the opposite direction relative thereto the sprags 16 will be moved into a wedged position so as to transmit torque from the one race to the other.

In order to properly position the sprags between the two concentric cylindrical races spring means 20 are provided. The spring means 20 is adapted to position the sprags 16 at uniform circumferentially spaced intervals between the races 12 and 14 in a near radial configuration. The spring means 20 is adapted to engage the sprags 16 and to hold the opposite cam surfaces 18 thereof in engagement with the inner and outer surfaces of the races 12 and 14 respectively. The spring means 20 thereby further acts as a cage or retaining member and obviates the necessity of an additional sprag retaining member. As employed, the spring member may be used to retain any desired number of sprags or combination of sprag and bearing means. In the present instance, the spring means 20 is a wire-like member having separate loops 22 formed at circumferentially spaced intervals along its length. The loops 22 are formed by bending the spring wire back upon itself as at 24 and by providing substantially straight and radially disposed portions 26 connected by a circumferentially disposed portion 28 completing the loop.

The sprags themselves include projecting shoulders or lugs 30 formed on opposite sides thereof which are adapted to be engaged by and to fit within the spring loops 22. The shoulders 30 also include an outer end portion 32 perpendicular thereto and of a greater cross sectional area to form a retainer for holding the spring loop 22 to the sprag 16. The shoulders 30 of the sprags 16 are substantially rectangular in shape having side surfaces 34 parallel to the transverse sides of each sprag. The engagement of the radial portions 26 of the loop 22 with the side surfaces 34 of the shoulders or lugs 30 thereby holds the sprag 16 in the alignment predetermined by the disposition of the radial portion of the spring means. The intermediate, substantially rigid portion 36 connecting each loop 22 may normally be substantially straight with the so-called radial portions 26 perpendicularly disposed with respect thereto. When the spring member 20 having the sprags 16 secured thereto is placed between the concentric cylindrical races 12 and 14 and is curved to conform to the circular space 38 provided therebetween the radial portion 26 will be resiliently moved from its normal position and the cam surfaces 18 of the sprags will be thereby biased in engagement with opposite surfaces of the races 12 and 14.

The rearwardly bent portions 24 of the spring member 20 forming the open end of the loop 22 do not engage in the present instance but provide a small gap 40 therebetween. However, the movement of one sprag will be transmitted through the intermediate portion 36 of the spring member 20 to the adjacent sprag and will cause such adjacent sprag to be moved in a like manner as the first. Similarly, each following sprag is likewise moved.

During installation of my unit-handling sprag and spring assembly, each sprag is tilted away from an initial substantial radial position and entered between the races 12 and 14. This initial tilting of the sprags tilts each loop 22 with respect to its connecting intermediate spring portions 36. With this arrangement, each loop is yieldably preloaded and resiliently urges each sprag clockwise into a clutch-engaging position.

Under certain circumstances, it is desirable that the sprag be more firmly biased against the races and also that the movement of each sprag will assure positive simultaneous like movement of all other sprags. Accordingly, the spring means 20 shown in Figures 1 through 4 may be modified to include a flat spring member 42 of more resilient material. The flat ribbon-like member 42 is formed in a manner substantially similar to that of the previously described wire spring member 20 having a pair of radial portions 44 and a circumferential portion 46 forming a loop 48 with intermediate portions 50 connecting the loops together. The shoulders of the sprag are required to be slightly modified but only in dimension. It will readily be seen that the flat spring member 42 is capable of providing a more positive biasing of the sprags 16 and that the intermediate portions 50 having greater strength will assure more immediate movement of all other sprags since the intermediate portion is less likely to be buckled or deflected.

What is claimed is:

1. A sprag type clutch including concentric cylindrical races, a plurality of sprags having outwardly projecting lugs formed on opposite ends thereof, the sprags having substantially parallel transverse sides, said lugs including side surfaces parallel to the transverse sides of said sprags, annular spring means engaging said lugs and retaining said sprags in circumferentially spaced relation to each other between said races and in biased engagement with said races, said spring means including a plurality of circumferentially spaced loops having substantially straight sides respectively fitting against the said surfaces of said lugs, said straight portions of said loops tiltably urging said sprags in engagement with said races.

2. In a sprag type clutch having concentric cylindrical races and a plurality of sprags circumferentially disposed between said races, substantially rectangular projections extending outwardly from the sprag ends, means for retaining said sprags in uniform spaced relation and for biasing said sprags in engagement with said races, said means including a resilient wire ring having a plurality of radially projecting loops formed therein, said loops including substantially straight side portions and a circumferential portion connecting said side portions, said ring having intermediate arcuate portions connecting said loops and uniformly spacing said sprags, said loops matingly embracing said end projections on said sprags for biasing said sprags in engagement with said races and said intermediate portions being adapted to transmit the movement of any one of said sprags to the adjacent and succeeding sprags.

3. In a sprag type of clutch having a pair of coaxial cylindrical spaced races, a plurality of circumferentially spaced sprags for driving engagement between said races, each sprag having a body portion, substantially rectangular projections on each sprag respectively extending endwise from the ends of each sprag body portion, an annular flat spring member adjacent the ends of said sprags for retaining the sprags in circumferentially spaced relation and between said races, said spring member having substantially rigid flat intermediate portions respectively extending between adjacent sprag projections and having spaced looped portions interfitting with and gripping said projections for biasing the sprags in engagement with said races.

4. In a sprag clutch adapted to be disposed between a pair of coaxial cylindrical races, a plurality of circumferentially spaced sprags between said races, each sprag having a pair of spaced lugs respectively projecting from the opposite ends of the sprag, annularly extending spring means adjacent to said lugs for retaining the sprags in circumferentially spaced relation between said races and generally radially extending looped portions on said spring means respectively fitting around said lugs for biasing the sprags in engagement with said races.

5. In a sprag clutch for driving connection between coaxial cylindrical races in radially spaced relation, a plurality of tiltable sprags between and engageable with said races, an end of each sprag having a shouldered projection extending endwise therefrom, an annular spring member at the sprag ends adjacent to said projections and locating the sprags in circumferentially spaced relation, said spring member having a plurality of circumferentially spaced looped portions respectively gripping the shouldered projections in non-rotatable relation, and each looped portion yieldably and tiltably urging its engaged sprag into driving relation with both races.

6. In a sprag clutch for driving connection between coaxial cylindrical races in radial spaced relation, a plurality of tiltable sprags between and engageable with said races, each sprag end having a shouldered projection extending endwise therefrom, a pair of annular spring members respectively located at the corresponding sprag ends adjacent to said projections and cooperatively positioning the sprags in circumferentially spaced relation, each spring member having a plurality of circumferentially spaced looped portions, each looped portion receiving one of said shouldered sprag projections in non-rotatable gripping engagement and each looped portion resiliently urging its engaged sprag into driving relation with both races.

7. In a sprag clutch for driving connection between coaxial races in radial spaced relation, a plurality of tiltable sprags between and engageable with said races, a shouldered projection extending outwardly from each end of each sprag, a pair of annular spring retainers respectively located at the corresponding ends of said sprag in radially spaced relation to both races, said spring retainers having correspondingly positioned circumferentially spaced looped portions gripping the shouldered sprag projections to secure said sprags in unit handling circumferentially spaced relation, and the looped portions at the opposite ends of each sprag cooperatively urging the sprag into driving relation with both races.

8. In a sprag clutch for driving connection between coaxial cylindrical races in radially spaced relation, a plurality of tiltable sprags between and engageable with both races, a non-circular lug projecting endwise from each sprag end, a pair of annular spring members respectively located at the corresponding sprag ends and in radially spaced relation to both of said races, each spring member having a plurality of arcuate portions and looped portions in alternating relation which position the sprags in circumferentially spaced relation, each looped portion non-rotatably embracing one of said lugs to yieldably and individually urge the sprag into driving relation with both races, and said arcuate portions being substantially rigid to transmit a corresponding tilting action between adjacent sprags.

9. In a sprag clutch for driving connection between coaxial cylindrical races in radially spaced relation, a plurality of tiltable sprags between and engageable with both races, a generally rectangular lug projecting endwise from each end of each sprag, a pair of annular spring members respectively located at the sprag ends and in radially spaced relation to both races, each spring member having a plurality of circumferentially spaced arcuate portions, each spring member having a substantially radially disposed looped portion interconnecting adjacent arcuate portions, each looped portion conformingly and non-rotatably fitting about one of said lugs to yieldably urge the sprags into driving relation with the races, and said arcuate portions being substantially rigid and transmitting a corresponding tilting action for the adjacent sprags.

10. In a sprag clutch for driving connection between coaxial cylindrical races in radially spaced relation, a plurality of tiltable sprags between said races, a lug projecting outwardly from each sprag end, said lug having a peripheral groove with a substantially flat portion, a pair of annular spring members respectively located at the corresponding ends of said sprag and in radially spaced relation to both races, each spring member having circumferentially spaced arcuate portions respectively extending between the lugs of adjacent sprags, each spring having a plurality of yieldable looped portions respectively connected with adjacent arcuate portions and fitted within one of said grooves to locate the sprag in circumferentially spaced unit-handling relation, and each looped portion having a flat portion fitted against the flat portion of a groove and tiltably urging the sprag into race driving engagement.

References Cited in the file of this patent

UNITED STATES PATENTS

| | | |
|---|---|---|
| 2,028,876 | Lotts | Jan. 28, 1936 |
| 2,407,772 | Dodge | Sept. 17, 1946 |
| 2,555,484 | Gruenberg et al. | June 5, 1951 |
| 2,624,436 | Gamble | Jan. 6, 1953 |
| 2,750,019 | Ferris | June 12, 1956 |